(12) United States Patent
Liu et al.

(10) Patent No.: US 9,067,694 B2
(45) Date of Patent: Jun. 30, 2015

(54) POSITION-BASED GYROLESS CONTROL OF SPACECRAFT ATTITUDE (71) Applicant: The Boeing Company, Chicago, IL (US)

(72) Inventors: Dan Y. Liu, Rancho Palos Verdes, CA (US); Richard Y. Chiang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/769,489

(22) Filed: Feb. 18, 2013

(65) Prior Publication Data

US 2013/0221160 A1 Aug. 29, 2013

Related U.S. Application Data (63) Continuation of application No. 12/487,187, filed on Jun. 18, 2009, now Pat. No. 8,380,370.

(60) Provisional application No. 61/149,453, filed on Feb. 3, 2009.

(51) Int. Cl.
*B64G 1/24* (2006.01)
*B64G 1/26* (2006.01)
*G05D 1/08* (2006.01)
*B64G 1/36* (2006.01)
*B64G 1/28* (2006.01)

(52) U.S. Cl.
CPC ............. *B64G 1/26* (2013.01); *G05D 1/0883* (2013.01); *B64G 1/283* (2013.01); *B64G 1/36* (2013.01); *B64G 1/361* (2013.01); *B64G 2001/245* (2013.01)

(58) Field of Classification Search
CPC ............................. G01C 21/02; G01C 21/025
See application file for complete search history.

(56) References Cited

U.S. PATENT DOCUMENTS

| | | | | |
|---|---|---|---|---|
| 5,259,577 A * | 11/1993 | Achkar et al. | ................ | 244/164 |
| 5,745,869 A * | 4/1998 | van Bezooijen | ............. | 701/513 |
| 5,791,598 A * | 8/1998 | Rodden et al. | ................ | 244/165 |
| 6,020,956 A * | 2/2000 | Herman et al. | .......... | 356/139.01 |
| 6,053,455 A * | 4/2000 | Price et al. | .................... | 244/169 |
| 6,102,338 A * | 8/2000 | Yoshikawa et al. | ........... | 244/171 |
| 6,108,593 A | 8/2000 | Didinsky et al. | | |
| 6,223,105 B1 * | 4/2001 | Teague | ........................... | 701/13 |
| 6,237,876 B1 * | 5/2001 | Barker | ......................... | 244/164 |
| 6,266,616 B1 * | 7/2001 | Needelman | .................... | 701/513 |
| 6,285,927 B1 * | 9/2001 | Li et al. | ......................... | 701/13 |
| 6,341,249 B1 * | 1/2002 | Xing et al. | ....................... | 701/13 |
| 6,454,217 B1 * | 9/2002 | Rodden et al. | ................ | 244/164 |
| 6,536,713 B2 * | 3/2003 | Vandenbussche et al. | .... | 244/165 |
| 6,600,976 B1 * | 7/2003 | Goodzeit et al. | ................ | 701/13 |
| 6,691,033 B1 * | 2/2004 | Li et al. | ......................... | 701/513 |
| 6,702,234 B1 * | 3/2004 | Goodzeit | ....................... | 244/164 |
| 6,732,977 B1 * | 5/2004 | Goodzeit et al. | ............. | 244/164 |
| 6,987,257 B2 * | 1/2006 | Peck et al. | ................. | 250/206.2 |

(Continued)

*Primary Examiner* — Jonathan M Dager (57) ABSTRACT

A system and a method for commanding a spacecraft to perform a three-axis maneuver purely based on "position" (i.e., attitude) measurements. Using an "inertial gimbal concept", a set of formulae are derived that can map a set of "inertial" motion to the spacecraft body frame based on position information so that the spacecraft can perform/follow according to the desired inertial position maneuvers commands. Also, the system and method disclosed herein employ an intrusion steering law to protect the spacecraft from acquisition failure when a long sensor intrusion occurs.

18 Claims, 5 Drawing Sheets

(56) References Cited

U.S. PATENT DOCUMENTS

| | | | |
|---|---|---|---|
| 7,835,826 B1* | 11/2010 | Weigl et al. | 701/4 |
| 7,970,586 B1* | 6/2011 | Kahn et al. | 702/189 |
| 8,185,261 B2* | 5/2012 | Patera | 701/4 |
| 8,265,804 B1* | 9/2012 | Uetrecht et al. | 701/13 |
| 8,315,749 B2* | 11/2012 | Ih et al. | 701/13 |
| 8,352,101 B2* | 1/2013 | Thomas et al. | 701/13 |
| 8,752,969 B1* | 6/2014 | Kane et al. | 359/872 |
| 2003/0009284 A1* | 1/2003 | Needelman et al. | 701/222 |
| 2003/0080255 A1* | 5/2003 | Li et al. | 244/158 R |
| 2004/0098178 A1* | 5/2004 | Brady et al. | 701/4 |
| 2004/0140400 A1* | 7/2004 | Goodzeit et al. | 244/164 |
| 2004/0144910 A1* | 7/2004 | Peck et al. | 250/206.2 |
| 2004/0148068 A1* | 7/2004 | Fowell et al. | 701/13 |
| 2005/0010337 A1* | 1/2005 | Li et al. | 701/13 |
| 2005/0027407 A1* | 2/2005 | Holt et al. | 701/4 |
| 2005/0060092 A1* | 3/2005 | Hablani | 701/213 |
| 2005/0071055 A1* | 3/2005 | Needelman et al. | 701/13 |
| 2005/0133670 A1* | 6/2005 | Wang et al. | 244/170 |
| 2005/0133671 A1* | 6/2005 | Wang et al. | 244/170 |
| 2005/0178874 A1* | 8/2005 | Wang et al. | 244/3.16 |
| 2006/0149474 A1* | 7/2006 | Needelman et al. | 701/222 |
| 2006/0186274 A1* | 8/2006 | Wang et al. | 244/158.4 |
| 2007/0023579 A1* | 2/2007 | Wang et al. | 244/158.6 |
| 2008/0046138 A1* | 2/2008 | Fowell et al. | 701/13 |
| 2010/0019092 A1* | 1/2010 | Liu et al. | 244/170 |
| 2010/0059631 A1* | 3/2010 | Wang et al. | 244/165 |
| 2010/0117894 A1* | 5/2010 | Velde et al. | 342/357.02 |
| 2010/0193641 A1* | 8/2010 | Liu et al. | 244/165 |
| 2011/0024571 A1* | 2/2011 | Tsao et al. | 244/171 |
| 2012/0097797 A1* | 4/2012 | Woo et al. | 244/158.6 |
| 2013/0193303 A1* | 8/2013 | Smith et al. | 250/203.6 |
| 2014/0231589 A1* | 8/2014 | Tsao et al. | 244/171 |
| 2014/0236401 A1* | 8/2014 | Tsao et al. | 701/13 |

* cited by examiner

POSITION-BASED GYROLESS CONTROL OF SPACECRAFT ATTITUDE

RELATED PATENT APPLICATION

This application claims the benefit, under Title 35, United States Code, §119(e), of U.S. Provisional Application No. 61/149,453 filed on Feb. 3, 2009.

BACKGROUND

This invention is generally directed toward systems for bringing a spacecraft to a desired attitude. A position-based gyroless control has been invented to perform the acquisition maneuver for the spacecraft with no gyro information available but with position sensors (e.g., star trackers), which could be in a long intrusion during the maneuver.

The systems disclosed herein enable gyroless spacecraft acquisition maneuvers including power acquisitions with the spacecraft in either stowed or deployed configurations, wing/reflector deployments, on-station large-angle slew, antenna mapping, attitude hold in momentum dump, etc.

In a typical spacecraft attitude control system (ACS), a gyro plays a crucial role in performing the spacecraft acquisition maneuvers, in either stowed or fully deployed configurations. However, due to limited resources, a program may opt to use only a single on-board gyro, which drastically increases the risk factor in the area of fault autonomy. As other position sensors, such as star trackers, become more advanced and powerful, an algorithm using attitude reference, instead of rate reference, is needed for the spacecraft with no inertial reference unit (IRU) data available in either the toggle alternate or post-toggle state.

Disclosed herein is a position-based gyroless control system using position sensors to drive the spacecraft acquisition maneuvers under various maneuver scenarios. Furthermore, a sensor intrusion will prevent an attitude estimate update when a position sensor is used, resulting in an attitude drift from intrusion. A method is provided to lessen the impact of sensor intrusions using the position control technique disclosed herein.

In the past, gyroless operation existed but was only applicable for a few minutes during the entire mission on a need basis, i.e., to switch the gyro to its backup assembly when the primary unit failed. Before the redundant gyro warmed up, the ACS needed a "gyroless" control to monitor the system stability for a short while. For such a momentary gyroless ACS, analysts in the past simply relied on the so-called "derived rate" from the position sensors such as star trackers or earth sensors. They used the existing control laws to close the ACS loop, as if the rate information was always available. Some prior spacecraft have turned off the gyro during the on-station safe-hold mode, but they could not (did not) perform any gyroless "maneuvers" as described herein.

"Deriving the rate" when the gyro is not available tends to produce huge noise and is much worse than the original rate information. One can filter the noise to some extent but at a cost of sacrificing system stability margins. As a result, this noisy "artificial" rate information can produce poor performance, saturate the control actuation capability, limit the controllability and observability of the ACS, and eventually jeopardize the entire spacecraft attitude stability and cause the spacecraft to tumble. In the past, since "gyroless" operation only happened less than 0.001% of the mission time span, using a "derived rate" temporarily was acceptable before rate noise drift contaminated the ACS. But for a serious official "gyroless" mission maneuver, a "derived rate" becomes awkward and troublesome and an algorithm using the position sensors is critically needed.

BRIEF SUMMARY

The system and method disclosed herein need not rely on rate measurement for any acquisition maneuvers. Instead the system can simply command the spacecraft to do a 3-axis maneuver purely based on "position" measurement. Using an "inertial gimbal concept", a set of formulae were derived that can map a set of "inertial" motion to the spacecraft body frame based on position information so that the spacecraft can perform/follow according to the desired inertial position maneuvers commands. Also, the system and method disclosed herein employ an intrusion steering law to protect the spacecraft from acquisition failure when a long sensor intrusion occurs.

Previous acquisition maneuvers such as power acquisition, on-station large-angle slew, antenna mapping, etc. relied on rate measurements from gyros. The system disclosed herein can perform these maneuvers with only attitude measurements from position sensors.

Fault autonomy design on power acquisition (either during the spinning transfer orbit or on station) and other on-station acquisition maneuvers cannot be closed with previous methods relying on a redundant gyro. The present invention allows a failsafe design to work with position sensors only when the single on-board gyro has failed. Furthermore, the algorithms as disclosed herein work as a fuel saver since the power acquisition maneuvers can be performed on wheels, instead of thrusters.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION

Figure 1:
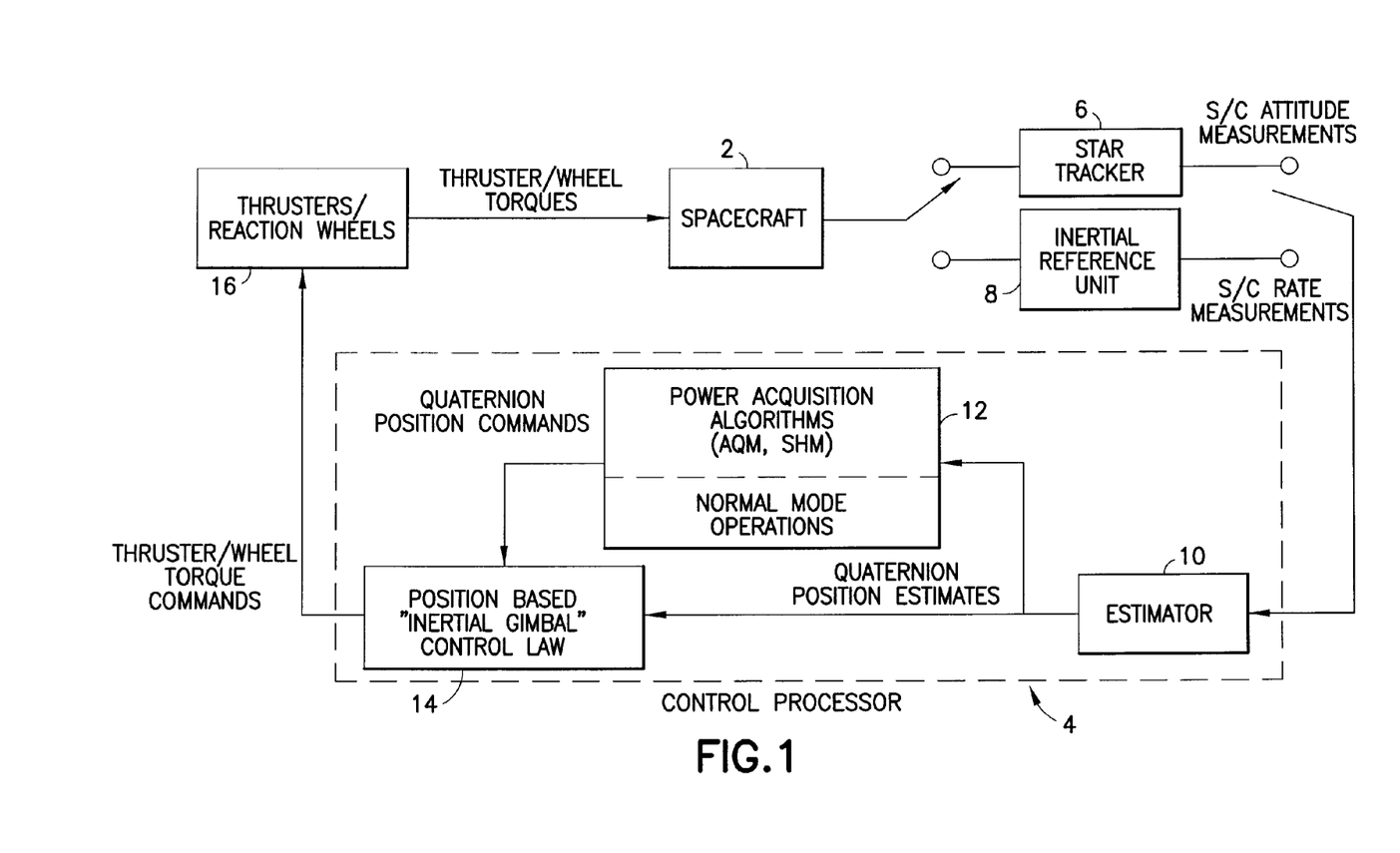
FIG. 1 is a schematic block diagram of an attitude control system for spacecraft acquisition maneuvers using position-based gyroless control in accordance with one embodiment of the invention.

In accordance with one embodiment depicted in FIG. 1, the system for controlling the attitude of a spacecraft 2 comprises a plurality of star trackers 6 as position sensors, an inertial reference unit (IRU) 8, thrusters/reaction wheels 16 as actuators, and a control processor 4 having a plurality of flight software modules, including an estimator 10, a position-based controller 14, and power acquisition algorithms (AQM, SHM) and normal mode logic (NRM) (block 12 in FIG. 1). The power acquisition algorithms output quaternion position commands to direct the acquisition maneuvers and place the spacecraft 2 in a power/thermal safe state. The normal mode logic outputs quaternion position commands to perform a large-angle slew or to hold attitude. The estimator 10 computes spacecraft attitude and rate estimates based on attitude measurements received from the star trackers 6. The position-based controller 14 uses the commanded and estimated attitude to compute the thruster or wheel torques, or both. This system also provides the flexibility of using either rate or attitude measurements with the same control law design, which greatly reduces the flight software complexity.

Each star tracker 6 is an optical sensor used to identify the stars in space. Star trackers overcome earth sensor obsolescence while providing higher pointing accuracy and robust attitude determination.

The IRU 8 is an on-board sensor used to measure the spacecraft body rates with respect to an inertial reference frame. The terms "gyro" and "IRU" are used herein interchangeably to refer to the same rate sensing device. The present invention makes it possible to control spacecraft attitude without using the IRU or without any IRU aboard the spacecraft.

In accordance with one embodiment, the estimator 10 seen in FIG. 1 involves an attitude estimation processing which uses the attitude measurements from the star trackers as input to derive the quaternion position estimates (i.e., the estimated spacecraft attitude in terms of a quaternion) as output to modules 12 and position-based controller 14. The estimator can also compute rate estimates based on the attitude measurements. A rate estimate is an estimate of the spacecraft roll, pitch and yaw body rates with respect to an inertial reference frame. The computations performed by estimator 10 are known to persons skilled in the art.

The "Normal Mode Operations" seen in FIG. 1 is basically a normal mode phase sequencer used to direct the spacecraft normal on-station operation such that the estimated attitude in terms of quaternion position estimates will follow the quaternion commands closely through the control system 14 designed based on the position-based inertial gimbal control concept.

The system includes two additional phase sequencers that are related to the power acquisition algorithms seen in FIG. 1. The function of the sun acquisition mode (AQM) phase sequencer is to achieve and maintain a power and thermal safe state during the transfer orbit. The function of the safe hold mode (SHM) phase sequencer is to achieve a power and thermal safe state during the post-wing-deployment phases of the mission and on-orbit.

The term "power and thermal safe state" means the spacecraft is in either a slow rotisserie about a selected body axis with the solar wing panels on sun exposure periodically, or a stationary attitude such that the solar panels are on sun exposure continually. A successful sun acquisition will hold the wings on the sun, providing enough power to support the spacecraft loads, including power for the necessary heaters.

The system disclosed herein uses a proportional feedback controller architecture (block 14 in FIG. 1) to calculate the thruster/wheel torque commands. This means that the control system uses the sensor signals as input to estimate the spacecraft attitude and rates and then calculate the control signal commands, based on the commanded and estimated attitudes/rates, through a linear controller to drive the control actuator. The position and rate control gains of the controller are designed based on the position-based gimbal control concept described herein. A two-state H-infinity control law was designed for transfer orbit spacecraft dynamics to meet the stability, performance and robustness requirement. It is identical in each axis, hence easy to be implemented. The control law was based on position-only command and position-only feedback sampled at 4 RTI (0.1311 sec). Its z-transform realization is $$G(z) = \frac{0.001z^2 - 0.00026z - 0.0007326}{z^2 - 1.7z - 0.7046}$$

The system disclosed herein is characterized by its position-only control and the method of generating position command relies on continued attitude determination on attitude sensor. It can be used, with no gyro information, to (1) place and maintain the spacecraft, in either stowed or fully deployed configurations, in a power/thermal safe state from a post-toggle and (2) perform on-station large-angle slew and/or attitude capture. Furthermore, this system provides a gyroless intrusion steering law (part of the AQM and SHM algorithms) to protect against possible acquisition failure from a long sensor intrusion. The gyroless intrusion steering law is applied to the phases of the AQM and SHM phase sequencers wherever it is applicable.

Figure 2A:
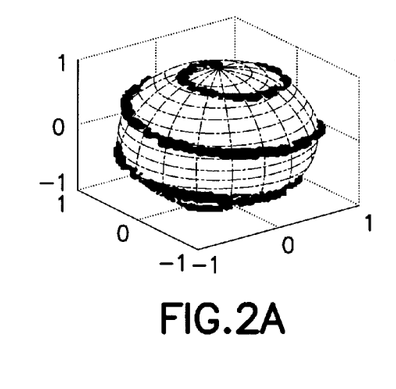
FIGS. 2A and 2C show a three-dimensional side view of a spiral acquisition pattern, while the two plots seen in FIGS. 2B and 2D show the top views of that spiral pattern.
Figure 2B:
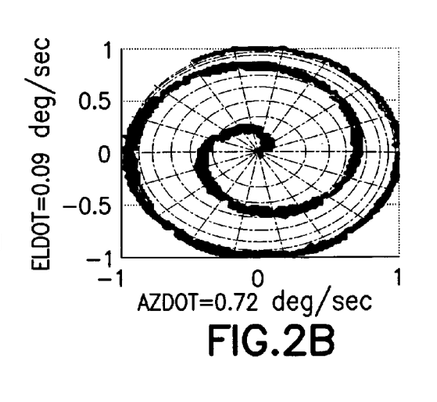
Figure 2C:
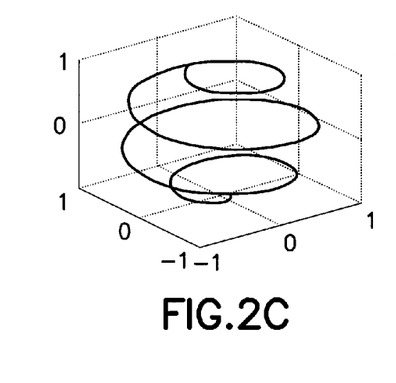
Figure 2D:
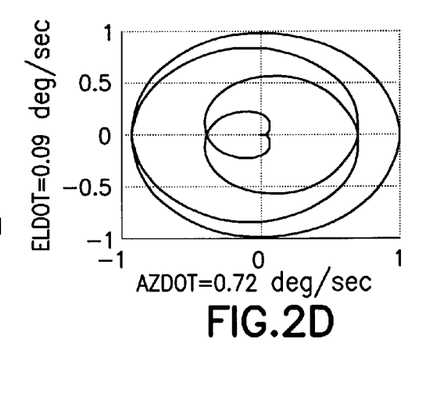

The embodiment disclosed herein uses an "Inertial Gimbal Concept" to represent the inertial space with a two-axis gimbal. The functionality of the gimbal is to represent a three-dimensional inertial space with elevation, azimuth and rotation of boresight. The azimuth and elevation rotations of the gimbal axes cover the entire three-dimensional sky. One can use the "Inertial Gimbal Concept" to derive a set of quaternion commands that allow a spacecraft to perform the desired 3-axis acquisition maneuvers on attitude sensor. [The phrase "on attitude sensor", as used herein, means that the attitude control system uses the attitude sensor (e.g., star trackers) measurements as references to estimate the spacecraft attitude and perform desired acquisition maneuver control such that the estimated attitude will closely follow the attitude command.] The Euler angles (in three dimensions) can be represented by elevation, azimuth and rotation of boresight. The basic idea of the "Inertial Gimbal Concept" is to rotate the gimbal in two directions—one about "Azimuth" and the other about "Elevation"—at rotation rates that create a "spiral" maneuver pattern needed for an acquisition maneuver. Therefore moving the gimbal systematically can carry out the required Euler transformation sequences systematically. This spiral pattern is a three-dimensional acquisition pattern. The center of the star tracker field of view forms a "spiral shape" trajectory as shown in FIGS. 2A-2D. The two plots seen in FIGS. 2A and 2C show a three-dimensional side view of the spiral pattern (total time=2,000 sec). The two plots seen in FIGS. 2B and 2D show the top views of the spiral pattern.

Figure 3:
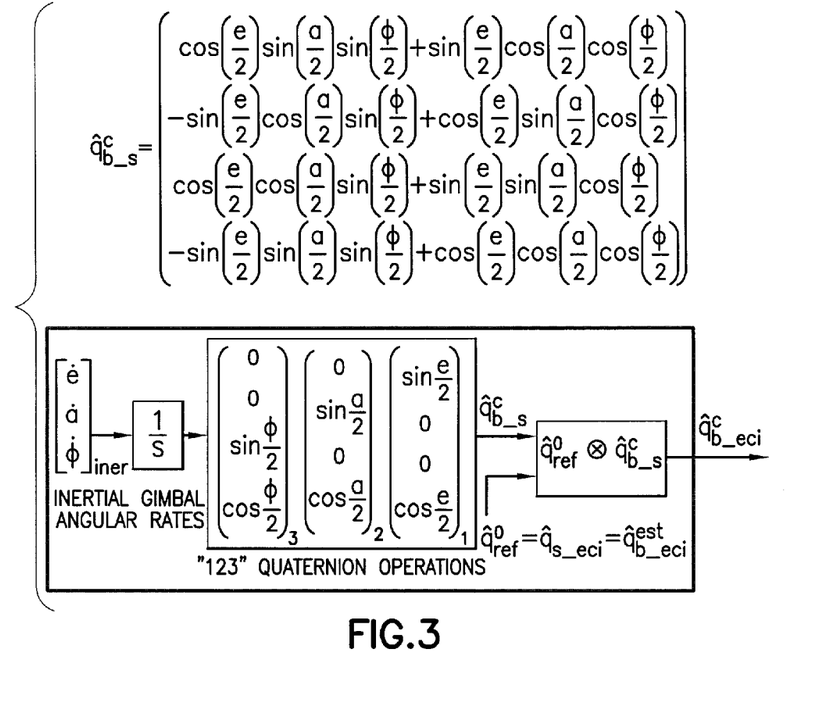
FIG. 3 shows quaternion position commands with respect to an inertially fixed gimbal frame.

More specifically, this invention employs a 1-2-3 Euler sequence of rotation to map the inertially fixed gimbal motion to spacecraft body motion via the quaternion operation: T= $[\phi]_3[a]_2[e]_1$ where "e" is the EL gimbal angle, "a" is the AZ gimbal angle, and "$\phi$" is the spin angle. (Quaternion representation is used for convenience.) The total combined transformation in terms of a set of quaternion commands with respect to the inertially fixed gimbal frame is shown in FIG. 3. In FIG. 3, the block labeled 1/S indicates an integrator that integrates the input rates to get positions.

The present invention includes phase sequencers to direct desired power acquisition with position-based control on attitude sensor. The acquisition mode logic state diagram is given in FIG. 4 for the spacecraft at stowed configuration (AQM) and in FIG. 5 for the spacecraft at deployed configuration (SHM).

AQM provides an emergency sun acquisition capability during transfer orbit. It can put the spacecraft in a power/thermal safe state for an extended period of time from arbitrary initial conditions (attitude or rate). It is useful for anomaly recovery. AQM uses thrusters to spin up/down and wheels to find the sun and hold the spacecraft on a power/thermal safe state.

In brief, the AQM works as follows. First, AQM uses extended transfer orbit slit sun sensors with a ±75 deg field-of-view to place the sun vector in the body X/Z plane, followed by a Z-reorientation to place the Z body axis perpendicular to the sunline. Then the spacecraft uses thrusters to spinup to 0.6 deg/sec about the Z body axis and remains at this rate using wheels with the sun in the X/Y plane and well-illuminated solar panels.

AQM can use either gyro data or star tracker data to execute an acquisition maneuver. In either case the position-based "inertial gimbal" control loop is used; the commanded quaternion is updated using the desired $\phi$, AZ (azimuth), and EL (elevation) rates to define the desired position of the spacecraft axes throughout the entire AQM execution.

Figure 4:
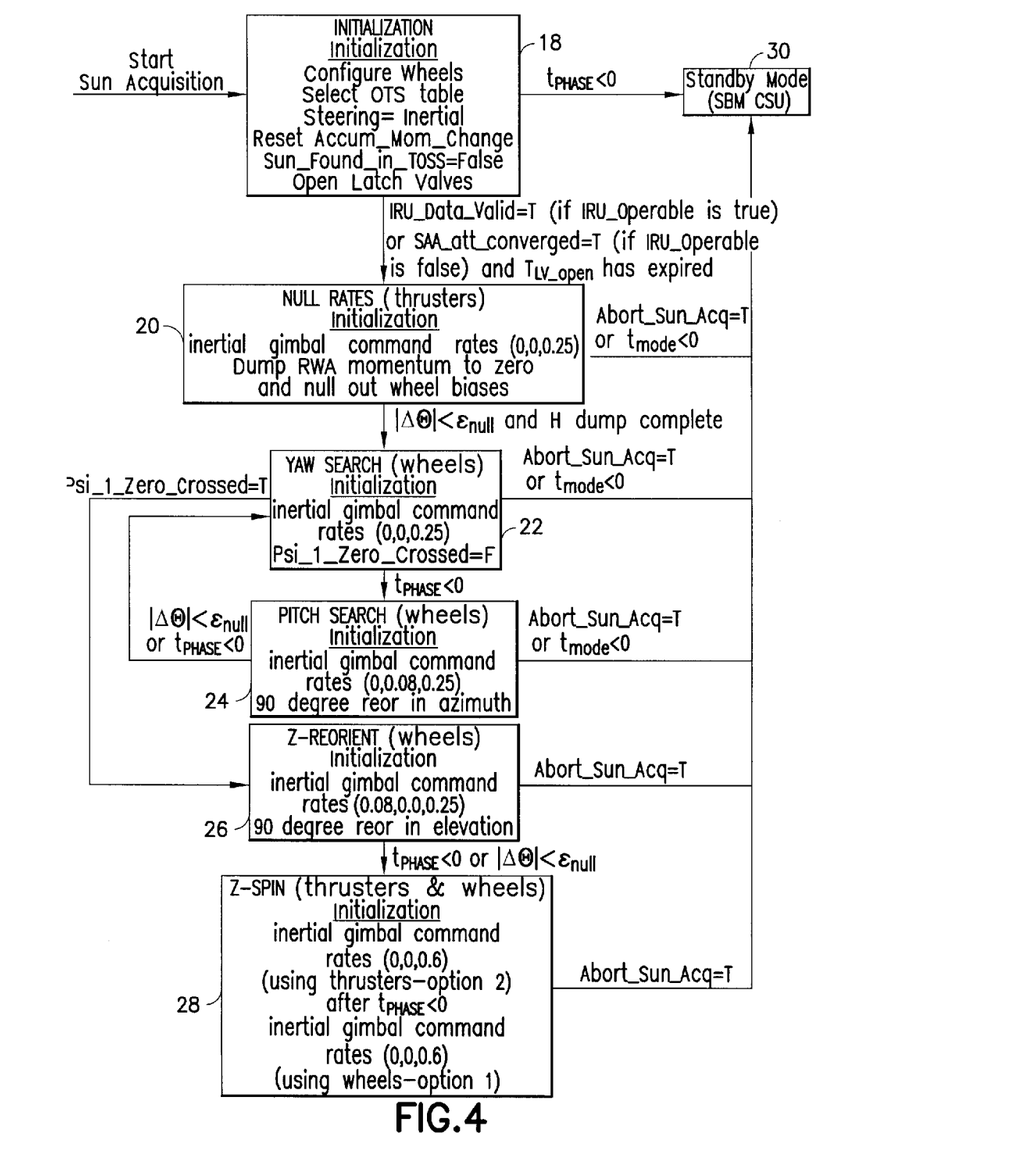
FIG. 4 is a power acquisition mode state logic diagram for spacecraft at a stowed configuration (AQM).

More specifically, the initialization procedure for AQM is shown in phase 18 of FIG. 4. As seen in FIG. 4, the AQM algorithm (1) first spins down the spacecraft from initial rates to [0, 0, 0.25] deg/sec and performs momentum dump via the thruster (phase 20); (2) then performs yaw search/keyhole slew to bring the sun in the sun sensor field-of-view on wheel (phases 22 and 24); (3) performs a 90-deg Z-reorientation to ensure the sunline is normal to the solar panels on wheel (phase 26); and (4) finally spins up via the thruster again to [0, 0, 0.6] deg/sec and then switches to use wheels to hold the Z-spin in a safe hold state (phase 28). The Z-spin phase is the final phase of AQM. In this safe-hold phase, the spacecraft is spinning about the yaw-body axis (i.e., Z-body axis) at a constant rate of 0.6 deg/sec. The outer solar panels of the stowed north and south solar wings are on the sun every 300 seconds at this rate. The wheel control remains active in order to keep the spacecraft spinning at this rate. The spacecraft remains in this "Z-spin" state with active wheel control indefinitely, i.e., at this point the spacecraft is waiting for ground interference (e.g., sending commands to exit the acquisition mode, reconfigure the spacecraft back to the normal transfer orbit operation, etc.).

An existing spacecraft fleet employs the regular (heritage) AQM to perform the sun acquisition maneuver with thruster control and ends with, in the safe hold state, the spacecraft spinning about the X-body axis in the Standby Mode with no control. (This is what the term "free X-spin" means.) Note that the X-spin is dynamically stable and an active control is not required. The new AQM as presented in this disclosure is designed to perform the maneuvers on wheel instead (i.e., a fuel saver) and ends with the spacecraft spinning about the Z-body axis while wheel control remains active. The uniqueness of this new approach is as follows.

The heritage "free X-spin" may not be feasible for the acquisition maneuver on wheel since the X-body axis is the major axis with much larger inertia about this axis than the Z-body axis (minor axis). When performing the Z-to-X momentum reorientation as needed to bring the spacecraft to the safe hold state, the spacecraft will experience a significant momentum exchange between the body/wheel if with the wheel control, resulting in a wheel momentum saturation and consequently, an acquisition failure. The new AQM disclosed herein takes advantage of the smaller spacecraft inertia about the Z-body axis, at which the step of Z-to-X momentum reorientation as needed for the heritage AQM can be omitted, but still, needs to remain in wheel control since the Z-body axis is dynamically unstable. (Note that the spacecraft can be in either X-spin or Z-spin to meet the power and thermal safe requirement.)

SHM provides an emergency sun acquisition capability during the post-wing-deployment phases of the mission and on-orbit. It can put the spacecraft in a power/thermal safe state for an extended period of time from arbitrary initial conditions of attitude and rate (limited by the momentum storage capability of the RWAs). SHM uses thrusters or wheels to null rates and wheels to find the sun and hold the spacecraft in a power/thermal safe state. SHM also provides the momentum dump capability when the thruster option is selected.

SHM achieves a power and thermal safe state for the spacecraft by commanding coordinated slews of both the body and the wings until the wing current is above a set threshold.

Finally, SHM can use either gyro data or star tracker data to execute an acquisition maneuver. In either case, a position-based "inertial gimbal" control loop is used; the commanded quaternion is updated using the desired $\phi$, AZ (azimuth), and EL (elevation) rates to define the desired position of the spacecraft axes throughout the entire SHM execution.

Figure 5:
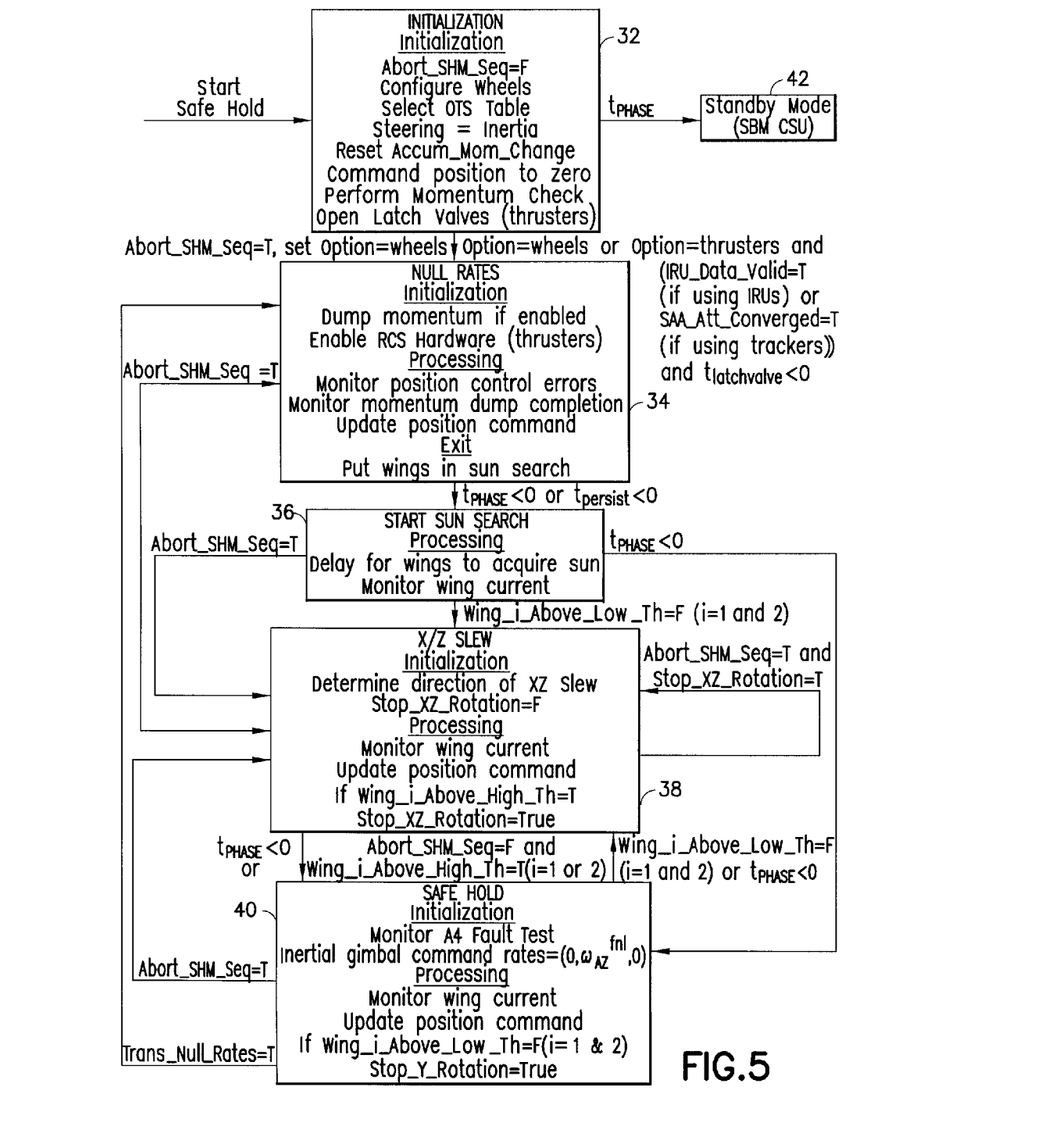
FIG. 5 is a power acquisition mode state logic diagram for spacecraft at a deployed configuration (SHM).

More specifically, the initialization procedure for SHM is shown in phase 32 of FIG. 5. The SHM algorithm (1) first nulls initial rates to zero and performs a momentum dump (if required) via the thruster (phase 34); (2) then places the wings in a sun search mode (phase 36); (3) then performs X/Z slew (if required) to pass the wing current test on wheel (phase 38); and (4) finally performs pitch rotisserie at 0.1 deg/sec on wheel (phase 40).

With the "Inertial Gimbal Concept" described above, the system disclosed herein calculates the quaternion position commands, in each mode phase, to yield a desired maneuver in the Earth Centered Inertial (ECI) frame. The method of calculation is as follow (referring again to FIG. 3).

(i) Upon entry to a new mode phase, use the body-to-ECI quaternion estimate from an Attitude Determination (ATD) software module at phase entry as a local "inertial reference" (defined as original reference): $\hat{q}_{ref}^{o} = \hat{q}_{b\_ect}^{est} (= \hat{q}_{s\_ect})$. The ATD software module is part of the estimator seen in FIG. 1. The ATD software module performs the following functions: (1) provide a real-time estimate of the attitude of the bus with respect to an inertial reference frame; (2) provide a real-time estimate of the angular rate of the body relative to an inertially fixed reference; (3) provide a real-time estimate of the residual angular acceleration of the body; (4) provide a real-time estimate of the gyro rate biases; and (5) provide a function to predict or estimate the attitude for a time not equal to the current time. The ATD is a heritage attitude determination algorithm, but with the estimation gains designed based on the position-only inertial gimbal control concept.

(ii) While in the mode phase processing, calculate the gimbal angle commands e, a, $\phi$ based on gimbal rate commands ė, ȧ, $\dot{\phi}$ functionally set for each phase, and calculate the corresponding quaternion position commands $\hat{q}_{b\_s}^{c}$ with a 1-2-3 Euler sequence of rotation given in FIG. 3, which specifies the commanded spacecraft attitude relative to the local "inertial reference".

(iii) Update the quaternion position commands relative to the ECI frame: $\hat{q}_{b\_ect}^{c} = \hat{q}_{ref}^{o} \otimes \hat{q}_{c\_s}^{c}$ and send it to a Bus Steering (STR) software module as an input to the position-based "inertial gimbal" control loop. (The STR software module is part of block 14 shown in FIG. 1.) The STR software module performs the following functions: (1) provide the attitude determination reference frame to the Attitude Determination (ATD) software module; and (2) provide spacecraft body (bus) steering commands to the proportional feedback controller. The STR software module is a heritage bus steering module.

(iv) Exit to next mode phase when the position errors become small and other exit criteria are met.

As previously mentioned, a gyroless intrusion steering law is used at control intrusion induced by attitude reference dropping (for example, star tracker sun/earth intrusions). When position control is resumed from a long intrusion, it may cause, without the steering law, excessive thruster firings on large position control errors growing under no control state and subsequent acquisition failure. The intrusion steering law is developed to maintain zero position control errors during intrusions, and small attitude transients in the post-intrusion by deriving a set of alternated "inertial" references. The intrusion steering law involves a two-stage operation that works as follows (for all mode phases).

(i) The first stage of the steering law is to maintain zero position errors when attitude reference becomes unavailable and the spacecraft is in no control state. The steering law stops the normal function of the mode phase in processing and generates a temporary "inertial reference" $\hat{q}_{ref}$ to substitute for the original reference $\hat{q}_{ref}^o$ at each dispatch time:

$$\hat{q}_{ref} = \hat{q}_{b\_ect}^{est} \otimes (q_{b\_s}^c)^{-1}$$

at which the quaternion position command output to the STR software module will follow the quaternion estimate $\hat{q}_{b\_ect}^{est}$ from the ATD software module closely, resulting in a zero position control error during the intrusion.

(ii) The second stage of the steering law is to perform a quaternion reference slew, after intrusion is over and control is resumed, to bring the current reference $\hat{q}_{ref}$ at control resumed ($=\hat{q}_{ref}^f$) to the original reference $\hat{q}_{ref}^o$ at a slew rate $\hat{\omega}_{slew}$. (If an intrusion occurred in Z-spin phase, for example, this will set the quaternion reference back to where the full wing currents are acquired at phase entry). First, the steering law determines the slew axis and angle:

$$\hat{q}_{slew} = (\hat{q}_{ref}^f)^{-1} \otimes \hat{q}_{ref}^o$$

$$\hat{e} = \text{slew axis} = \hat{q}_{slew}(1:3)/|\hat{q}_{slew}(1:3)|$$

$$\theta_{slew,max} = \text{maximum slew angle} = 2\cos^{-1}[\hat{q}_{slew}(4)]$$

Next, the steering law generates the intermediate quaternion reference $\hat{q}_{ref,1}$ $$\theta_I = \text{intermediate slew angle} = \theta_I + \text{sign}(\theta_{slew}) * \hat{\omega}_{slew} * \Delta T;$$

$$|\theta_I| \leq |\theta_{slew,max}|$$

$$\hat{q}_I = \left[\hat{e}_1\sin\frac{\theta_I}{2}, \hat{e}_2\sin\frac{\theta_I}{2}, \hat{e}_3\sin\frac{\theta_I}{2}, \hat{e}_4\cos\frac{\theta_I}{2}\right]^T$$

$$\hat{q}_{ref,1} = \hat{q}_{ref}^f \otimes \hat{q}_I$$

where $\Delta T$ is the acquisition mode dispatch time. The acquisition resumes its normal processing once $\theta_I = \theta_{slew,max}$.

Thus, using an "Inertial Gimbal Concept", the inventors have developed a position-based acquisition maneuver control method which allows the spacecraft to perform 3-axis maneuvers in the mission without using or deriving any "rate" information. As a result, the spacecraft can put the gyro in the backup mode or eliminate the gyro sensor hardware/software completely in future missions, which can save a program at least multi-millions of dollars for the gyro hardware itself as well as its additional operation/maintenance service fees.

To supplement the foregoing disclosure, the functions of each AQM and SHM phase will now be described in greater detail.

Transfer Orbit Emergency Sun Acquisition (AQM)

AQM is designed to achieve a power/thermal safe state during transfer orbit. It uses the yaw sensor to eventually place the sun vector in the body X/Y plane. The yaw sensor is a body-mounted slit sun sensor located on the plane normal to the −X axis with an FOV range of ±75 degrees. Only the yaw sensor crossing indicator is required, not the angular position from sensor null. Initially, thrusters are used to spin the spacecraft about its Z axis and dump any momentum in the wheels. The attempt to find the sun with the sensor starts by commanding a wheel-based body slew around the spacecraft yaw axis and waiting for a pulse from the yaw sensor. If a yaw sensor pulse is not seen after a full spacecraft revolution, then the sun is known to be in the "keyhole" along either the plus or minus Z axis, out of range of the yaw sensor. If the sun is in the keyhole, a 90-degree reorientation is executed under wheel control and the yaw slew is re-commanded. One of these yaw slews should have detected the sun with the yaw sensor pulse. Once the sun is detected, the Z-axis is reoriented by 90 degrees using wheel control to place the sun in the spacecraft X/Y plane. A final spin up around the Z-axis is then executed with thrusters to leave the spacecraft in Z-spin with the sun in the X/Y plane and well illuminated solar panels. The final Z-spin state will be actively controlled by the spacecraft using the reaction wheels.

AQM is designed to perform a successful sun acquisition with the default IRU. If the IRU is not available, AQM can also attempt an execution using star trackers. Nominally, data from both star trackers will be used to lessen the impact of tracker intrusions. In either case a position-based "inertial gimbal" control loop is used; the commanded quaternion is updated using the desired $\phi$, AZ and EL rates to define the desired position of the spacecraft axes throughout the entire AQM execution.

AQM could be invoked at any time after X to Z spin transition, and prior to wing deployment, from arbitrary initial conditions of attitude and attitude rate (within requirements limits) with respect to the sunline. It is designed for anomaly recovery. The algorithm includes features to make it robust to eclipse conditions.

The AQM software module is made up of the following six phases as shown in FIG. 4:

Initialization:

In the Initialization phase (phase 18 in FIG. 4), a series of configuration commands are issued, including commands to open the latch valves. A check is made that valid sensor data exists and the latch valve open timer has expired before proceeding to a Null Rates phase (phase 20 in FIG. 4). The normal transition is to the Null Rates phase after the latch valve open timer has expired; however, AQM will remain in the Initialization phase until either IRU or star tracker data are available or the initialization phase timer has expired.

Null Rates:

In the Null Rates phase (phase 20 in FIG. 4), thrusters will be fired to drive initial body rates to a 0.25 deg/sec around the spacecraft Z-axis using position-based commands ($\phi$ in the inertial gimbal scheme). Exit to a Yaw Search phase (phase 22 in FIG. 4) occurs when position errors are below a threshold for a persistence time and the wheel momentum dump has completed. Exit to a Standby mode (30 in FIG. 4) occurs on expiration of the phase timer. The latter condition may indicate a thruster problem. Note that if control type is set to none during the Null Rates phase, the phase timer countdown will be halted and the deceleration will be stopped until the control type is set back to thruster control. During this time, the initial reference quaternion is redefined to provide a position error of near zero to prevent errors from accumulating while the control type is none.

Yaw Search:

In the Yaw Search phase (phase 22 in FIG. 4), the body will be slewed about the yaw axis using position commands ($\phi$ in the inertial gimbal scheme) corresponding to a rate of 0.25 deg/sec. The slew is executed with reaction wheels and will continue until the sun is acquired in the yaw sensor or the phase timer expires. When acquired, AQM transitions to a Z-Reorient phase (phase 26 in FIG. 4). If the phase timer has expired without finding the sun in the yaw sensor, exit occurs to a Pitch Search phase (phase 24 in FIG. 4). AQM will sequence back and forth between the Pitch and Yaw Search phases until the sun is acquired, or until the mode timer expires, in which case exit occurs to the Standby Mode. This cycling between the Pitch and Yaw Search phases may indicate either a hardware failure or the sun in eclipse. If the sun is not in eclipse, then the attitude rates and positions are monitored to verify that the slews are occurring in the correct directions and that a full 360-degree rotation is accomplished in each yaw search phase. The default yaw search phase timer will be 1800 seconds, enough for a 450-degree yaw rotation.

Pitch Search:

In the Pitch Search Phase (phase 24 in FIG. 4), the spacecraft spin axis will be slewed 90 degrees about the inertial gimbal azimuth axis while still maintaining the 0.25 deg/sec spin about yaw. This maneuver is accomplished using reaction wheels. Once the slew is complete, the phase checks if the position error is below a threshold for a persistence time or the phase timer has expired. When the slew is complete, the Pitch Search phase exits to the Yaw Search phase (phase 22 in FIG. 4). The default duration of the phase timer corresponds to a 90-degree rotation around the inertial gimbal azimuth axis at the default azimuth slew rate, including ~10% pad. If the mode timer expires, then exit occurs to the Standby mode. The mode timer check is made on entry to the Pitch Search phase. If control type=none during the Pitch Search phase, the phase timer and the reorientation are paused, and will be resumed when spacecraft control is resumed Z-Reorient:

In the Z-Reorient Phase (phase 26 in FIG. 4), the Z axis is reoriented 90 degrees by means of an inertial gimbal elevation slew. During this phase the attitude position error is monitored to verify that the slew is proceeding in the right direction, and that a 90-degree reorientation has been accomplished by the end of the phase. The phase timer is monitored to verify that the correct amount of time is being allowed for the maneuver to complete. Exit will occur to a Z-Spin phase (phase 28 in FIG. 4) when either the attitude error is below a threshold for a persistence time, or when the phase timer expires, whichever comes first. Once again, it is critical that the reorientation be executed in the correct direction, as the reorientation will define the final sun angle of the spacecraft. So, entry to the Z-Reorient phase will only occur if a good position estimate is available, and the Z-Reorient phase will only transition to the Z-Spin Phase if the final attitude is correct. This is accomplished by storing the initial position estimate and using it as a reference. While control type=none, the position commands are updated to provide a zero position error and the phase timer is halted. However, once control type is no longer equal to none, the initially stored reference is once again used to determine the desired attitude for the reorientation, which ensures that the final spacecraft attitude will be sun safe.

Z-Spin:

In the Z-Spin phase (phase 28 in FIG. 4), the spacecraft is spun up about the Z-axis to 0.6 deg/sec with thrusters. During this phase the attitude rates are monitored to verify that the direction and magnitude of the spin are approaching the correct values, and the phase timer is monitored to verify that the correct amount of time is being allowed for the spin-up to complete. Once the phase timer expires or the position error is below a threshold, the thrusters are disabled and the spacecraft maintains Z-spin with active wheel control. As with the Null Rates phase (phase 20 in FIG. 4), if control type is set to none during the Null Rates phase, the phase timer countdown will be halted and the acceleration will be stopped until the control type is set back to thruster control. It will also set the quaternion reference to a value to provide a near-zero position error. However, the Z-Spin phase will also perform a slew to return to the initial quaternion reference. This is necessary because this initial reference represents a sun safe attitude, and the spacecraft must return to it to maintain a good sun angle.

On-Station Safe Hold Mode (SHM)

FIG. 5 shows the SHM logic. After an initialization phase, spacecraft rates are nulled to zero. Once the momentum dump, if enabled, is completed and position errors are below a certain threshold, a start sun search phase is commanded. During this phase, the wings are commanded to slew in the sun search mode until a current maximum is sensed by the solar array. The wing currents are checked and if both currents are below a threshold, the body is commanded to rotate using wheels about an axis lying in the X/Z-body plane, perpendicular to the axis of the wings. The wing currents are monitored as the body rotates, and when either wing current exceeds a threshold, the X/Z body rotation is stopped. The body is then placed in a slow pitch rotisserie to provide T&C coverage and thermal averaging over the body, while wing currents are continuously monitored with the wings in the sun search mode. If at any time both wing currents should drop below a threshold, the X/Z slew will be restarted. Therefore SHM is designed to maintain a power and thermally safe state for long periods of time.

The SHM software module is made up of the following five phases as shown in FIG. 5:

Initialization:

In an Initialization Phase (phase 32 in FIG. 5), if thruster control is selected, a check will be made that valid sensor data exists before proceeding to a Null Rates Phase (phase 34 in FIG. 5) and enabling the thrusters. If the IRU is available, SHM will check for valid IRU data; otherwise, it will check that the star tracker referenced attitude has converged. If wheel control is selected, or if thruster control is selected and valid sensor is detected, normal transition is to the Null Rates phase. If thruster control is selected and no valid sensor is detected, transition is to the Standby mode (42 in FIG. 5) once the phase timer expires. This phase also performs a momentum check to determine if momentum dump with thruster control is necessary in order to successfully complete sun acquisition without saturating the wheels.

Null Rates:

In the Null Rates phase (phase 34 in FIG. 5), thrusters or wheels will be used to drive initial body rates to zero using position commands. The phase timer is monitored during this phase. If this phase is entered from the Initialization phase, the phase timer will be set to a nominal value of 1200 seconds; otherwise if it is entered from a Safe Hold phase (phase 40 in FIG. 5), it will be set to the nominal value plus 1.21 hours to allow for a failed wheel to spin down due to friction. Once the phase timer is below Trate_null, the position control errors and the wheel momentum (if momentum dump is commanded) are monitored. When position control errors and the wheel momentum are below a threshold or the phase timer has expired, transition will occur to a Start Sun Search phase (phase 36 in FIG. 5). If thrusters were commanded, they will be disabled at this time and further control will be accomplished using wheels. Before exiting this phase the wings will be put into the Sun Search mode. Note that if control type is set to none during the Null Rates phase, the phase timer countdown will be halted and the persistence timer reset until the control type is set back to thruster control. During this time, the initial reference quaternion is reset to the estimated quaternion from the ATD software module to prevent errors from accumulating while the control type is none.

Start Sun Search:

In the Start Sun Search phase (phase 36 in FIG. 5), the sequencer waits for 600 seconds to allow the wings to acquire the sun. At the end of this time, wing current is monitored for up to 60 additional seconds. The phase timer and the wing currents are monitored. If the current in both wings persists below a low threshold, then exit occurs to the X/Z Slew phase (phase 38 in FIG. 5). Otherwise on expiration of the phase timer, exit occurs to the Safe Hold phase (phase 40 in FIG. 5). Note that if control type is set to none during the Start Sun Search phase, the phase timer countdown will be halted and the persistence timer reset until the control type is set back to wheel control.

X/Z Slew:

In the X/Z Slew Phase (phase 38 in FIG. 5), the body is commanded to slew about an axis in the X/Z body plane using position commands (EL and φ in the inertial gimbal scheme). The body rates and the total momentum in the body frame are checked to verify that the slew is proceeding in the correct direction and at the correct rate. If the wing current in either wing persists above a threshold, then a command is issued to stop the X/Z slew, and the phase timer is initialized to 400 seconds. When the position control errors are below a threshold for a persistence time, then exit to the Safe Hold phase (phase 40 in FIG. 5) occurs.

Note that if control type is set to none during the X/Z slew, the acceleration to the desired slew rate will be stopped until the control type is set back to wheel control. During this time, the reference quaternion is redefined to provide a position error of near zero to prevent errors from accumulating while the control type is none. However, this phase will also perform a slew to return to the initial quaternion reference before the X/Z slew is resumed. If control type is set to none during the X/Z slew stop maneuver, the phase timer countdown will be halted and the persistence timer reset until the control type is set back to wheel control.

Safe Hold:

In the Safe Hold phase (phase 40 in FIG. 5), the spacecraft is placed in a slow Y-rotisserie to meet power, thermal, and communications constraints. Wing currents are continuously monitored and the X/Z Slew phase is re-entered if they persist below a preset threshold Upon entry, the body is commanded to spin up the pitch body rate to 0.1 deg/sec using position commands (AZ in the inertial gimbal scheme) and remain in Y-rotisserie indefinitely. The body rates and the total momentum in the body frame are checked to verify that the slew is proceeding in the correct direction and at the correct rate. If control type is set to none during the acceleration state toward Y-rotisserie or in Y-rotisserie, the reference quaternion is redefined to provide a position error of near zero to prevent errors from accumulating while the control type is none. However, this phase will also perform a slew to return to the initial quaternion reference before the nominal control path resumed. In addition, the acceleration will be stopped until the control type is set back to wheel control when in the acceleration state.

If the current in both wings persists below a threshold, then a command is issued to stop the pitch slew and the phase timer is initialized to 400 seconds. The sequencer waits until the position control errors are below a threshold for a persistence time, and then exits back to the X/Z Slew phase (phase 38 in FIG. 5). If control type is set to none while performing the threshold test, the phase timer countdown will be halted and the persistence timer reset until the control type is set back to wheel control.

Upon entry to the Safe Hold phase, the number of wheels available is inspected to verify if a wheel failure has occurred, in which case the algorithm performs a single transition from the Safe Hold phase back to the Null Rates phase (phase 34 in FIG. 5). This transition is necessary in case a wheel failure causes a toggle with no stash recovery. In this case, the momentum check performed autonomously in the Initialization phase may pass, assuming that all four wheels are available. However, if indeed only three wheels are available, it is necessary to return to the Null Rates phase to perform a momentum dump in order to ensure that the remaining three wheels can absorb enough momentum for the spacecraft to be safe during the first 24 hours post-toggle. If it is desired to return to the Null Rates phase, the Safe Hold phase will command momentum dump and select wheel control. Wheel control will then be used in the Null Rates phase to avoid fuel usage until enough time has elapsed to allow the failed wheel to spin down to zero due to friction. After that, thruster control is commanded for the remainder of the Null Rates phase.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The invention claimed is:

1. A system for a spacecraft having a plurality of star trackers, the system comprising a control processor configured to:
   move the star trackers to create a three-dimensional spiral acquisition pattern;
   use attitude measurements from the acquisition pattern to generate spacecraft position estimates;
   generate attitude commands; and
   use a position-only control on the position estimates and the attitude commands to generate actuator torque commands.

2. The system of claim 1, wherein the position-only control includes a 1-2-3 Euler sequence of rotation to command spacecraft attitude relative to a local inertial reference frame.

3. The system of claim 2, wherein Euler angles are represented by elevation, azimuth, and rotation of boresight.

4. The system of claim 2, wherein the inertial reference frame is an Earth-centered inertial frame of reference.

5. The system of claim 1, wherein the control processor is further configured with a phase sequencer for generating the attitude commands for at least one of sun acquisition and safe hold.

6. A system for a spacecraft having a plurality of star trackers, the system comprising an attitude control processor configured to:

use attitude measurements from the star trackers to provide an attitude reference estimate for the spacecraft;
use the attitude reference estimate to generate spacecraft position estimates;
generate attitude commands;
use a position-only control on the position estimates and the attitude commands to generate actuator torque commands; and
continuously update the attitude reference estimate with the attitude measurements unless a sensor intrusion occurs.

7. A system for a spacecraft having a plurality of star trackers, the system comprising an attitude control processor configured to:
use attitude measurements from the star trackers to provide an attitude reference estimate for the spacecraft;
use the attitude reference estimate to generate spacecraft position estimates;
generate attitude commands; and
use a position-only control including a two-state H-infinity control on the position estimates and the attitude commands to generate actuator for torque commands.

8. The system of claim 1, wherein the position-only control generates the actuator torque commands for roll, pitch and yaw without utilizing gyro information.

9. A spacecraft comprising:
a plurality of star trackers;
torque actuators; and
the control processor of claim 1.

10. A method in a spacecraft, the method comprising:
generating an attitude reference estimate from star tracker attitude measurements;
generating spacecraft position estimates from the attitude reference;
generating attitude commands; and
using the position estimates and the attitude commands to cause actuators of the spacecraft to bring the spacecraft to a commanded attitude without utilizing gyro information;
wherein a 1-2-3 Euler sequence of rotation is used to command spacecraft attitude relative to a local inertial reference frame, and Euler angles are represented by elevation, azimuth, and rotation of boresight.

11. The method of claim 10, wherein the inertial reference frame is an Earth-centered inertial frame of reference.

12. The method of claim 10, wherein the attitude commands cause the spacecraft to perform at least one of sun acquisition and safe hold maneuver.

13. The method of claim 10, wherein the attitude reference estimate is continuously updated with the attitude measurements unless a sensor intrusion occurs.

14. The method of claim 10, wherein reaction wheels of the spacecraft are commanded to bring the spacecraft to the commanded attitude.

15. A method in a spacecraft, the method comprising:
generating an attitude reference estimate from star tracker attitude measurements;
generating spacecraft position estimates from the attitude reference;
generating attitude commands; and
using the position estimates and the attitude commands to cause actuators of the spacecraft to bring the spacecraft to a commanded attitude without utilizing gyro information;
wherein gyroscopes aboard the spacecraft are kept in backup mode while the actuators are being commanded.

16. A spacecraft comprising:
a plurality of star trackers;
a plurality of torque actuators; and
an attitude control processor for generating an attitude reference estimate from attitude measurements from the star trackers, generating spacecraft position estimates from the attitude reference, generating attitude commands including commands for at least one of sun acquisition and safe hold, and using the position estimates and the attitude commands to cause the actuators to bring the spacecraft to a commanded attitude without utilizing gyro information.

17. The spacecraft of claim 16, further comprising an inertial reference unit; wherein the control processor uses the attitude measurements from the star trackers instead of gyro information from the inertial reference unit to command the actuators.

18. The system of claim 1, wherein moving the star trackers includes rotating gimbals about Azimuth and Elevation at rates that create the spiral acquisition pattern.

* * * * *